United States Patent [19]

Vezirian

[11] 4,145,094
[45] Mar. 20, 1979

[54] ROTARY ROCK BIT AND METHOD OF MAKING SAME

[75] Inventor: Edward Vezirian, Fountain Valley, Calif.

[73] Assignee: Smith International, Inc., Newport Beach, Calif.

[21] Appl. No.: 849,771

[22] Filed: Nov. 9, 1977

[51] Int. Cl.² ............................................. F16C 33/00
[52] U.S. Cl. .................... 308/8.2; 76/108 A; 175/375; 219/121 EM; 308/139
[58] Field of Search ............... 175/369, 375, 368, 371, 175/372; 76/108 A; 308/8.2, DIG. 11, DIG. 4, 36.1, 36.3, 174, 139, 164, 163; 219/121 EB, 121 EM, 121 LM, 121 L

[56] References Cited

U.S. PATENT DOCUMENTS

| 1,839,589 | 1/1932 | Reed | 175/369 |
| 2,334,359 | 11/1943 | Stancliff | 175/375 X |
| 4,043,411 | 8/1977 | Lichte | 76/108 A X |

*Primary Examiner*—Douglas C. Butler

*Attorney, Agent, or Firm*—Smith International, Inc.

[57] ABSTRACT

A rotary rock bit is described having a plurality of legs extending downwardly from the main bit body. Each leg includes an annular bore extending through the lower extremity thereof. A separate journal pin is provided for each leg, with each journal pin having a mounting end and a bearing end. The mounting end of each journal pin is adapted to extend into the bore of a respective leg and be secured thereto by an electron beam welding process. The bearing end of the journal pin is adapted to receive an annular thrust member extending over the bearing surface thereof. The annular thrust member is secured to the journal pin by the same electron beam welding process step which welds the journal pin to the bore of the leg. A cone type cutter is adapted to be rotatably mounted on the bearing end of each journal pin with the annular thrust member functioning to retain the cutter on the journal pin and to absorb the in and out-thrust and radial loads passing therethrough.

21 Claims, 4 Drawing Figures

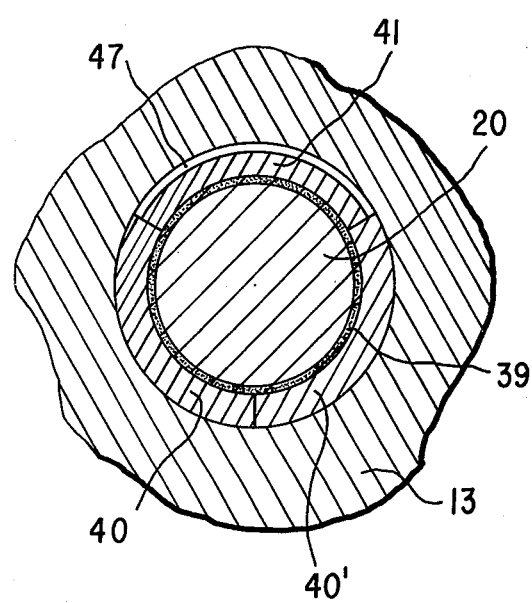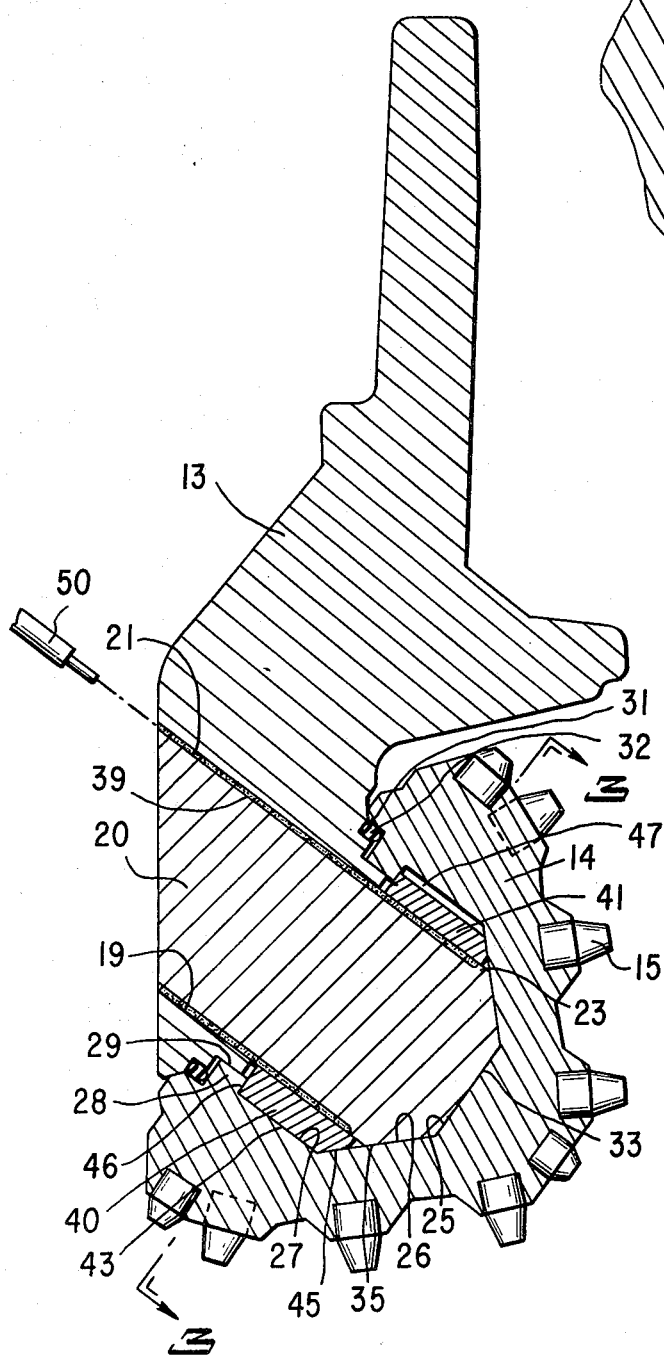

ROTARY ROCK BIT AND METHOD OF MAKING SAME

BACKGROUND OF THE INVENTION

1. Field of the Invention

The present invention relates generally to earth boring rotary rock bits and, more particularly, to rock bits in which separate journal pins are secured to the legs during the manufacturing operation.

2. Description of the Prior Art

A rotary rock bit usually comprises a plurality of legs welded together to form a bit body having one end threaded for attachment to a drill string. The lower end of each leg extends downwardly from the bit body and includes a journal pin extending radially inwardly for rotatably supporting a cone type cutter. Each cutter is adapted to roll along the bottom of the bore and is adapted to contact and disintegrate the earth formation at the bore bottom. In rock bit legs, the journal pins are usually formed integrally with the leg from a single forging. However, the journal pin includes bearing surfaces which must be machined. Having the journal pin integral with the leg makes the machining operation lengthy and more cumbersome. Moreover, the bearing surfaces of each journal pin must necessarily be carburized while the rest of the leg surface be painted over to prevent the remaining surface from being carburized. However, carbon leakage does occur on this surface which is deleterious to subsequent operations on the legs. As a result, it is preferable to form the journal pin separately from the leg in order to have it carburized and machined prior to assembling the pins to the legs.

U.S. Pat. No. 4,043,411 shows one method of having a separate journal pin secured to a leg. However, the shortcoming found in the method of manufacture of the rock bit legs of the referenced patent is that the welding is accomplished on the interior side of the leg, i.e. the cutter receiving surface side of the leg. Such a method of manufacture severely restricts the design capabilities of the journal pin. Moreover, with such a restriction, the cone cannot be preassembled with the journal pin prior to welding the pin to the leg and may require secondary operations to clean welded areas prior to final assembly.

Referring back to present day rock bits, such bits usually include ball bearings located between the journal pin and the cutter to provide some thrust bearing support and to retain the cone on the journal pin. However, these ball bearings are not capable of absorbing axial thrust loads in either axial direction of the journal pin. Therefore, their main utility is for retention only. Other problems with utilizing ball bearings is that during operation the cone has an undesirable rocking movement and an in and out thrust movement.

Alternatives to the ball bearings have been utilized in retaining the cutter onto the journal pin. One alternative is the utilization of an annular thrust member which is retained on the journal pin and secured to the cutter. Such thrust members are shown in U.S. Pat. Nos. 959,540, 979,496, 1,010,144, 1,010,406, 1,119,163, 1,124,241, 1,484,995, 1,692,793, 1,720,401, and 3,971,600. The shortcoming with these devices is that the annular thrust members have to be threadedly secured to the cutter. Such threaded connections are not desirable because of the hostile environment the cutters are subject to. Moreover, special machines and tools are required to manufacture threads and to threadedly tighten the annular thrust members during assembly. The use of such tools is awkward and positive tightening of the various members is not always guaranteed. Also, threaded details tend to loosen when the rock bit is in use.

SUMMARY OF THE INVENTION

The present invention obviates the above-mentioned shortcomings by providing a rock bit in which each leg has a separate journal pin and a cutter retaining thrust member that is secured during assembly in one simple manufacturing operation.

In its broadest aspect, the rock bit comprises at least one leg having a bore extending through the lower end thereof. A separate journal pin is provided having one end adapted to extend into the leg bore. The other end is adapted to receive an annular thrust member. The journal pin is secured to the bore and the annular thrust member is secured to the journal pin by means of a high energy beam which welds the mating surfaces of the various parts together in a single step. The thrust member functions to be captured within an internal groove formed in the cutter in order to retain the cutter onto the journal pin. The thrust member also functions to absorb the thrust loads passing from the cutter through to the journal pin.

The advantage of the present invention is that the annular thrust member is positively secured to the journal pin and without the need for any special tools. Another advantage of the present invention is that the various interface connections described above are accomplished in a single simple assembly method.

Another advantage is that the separate journal pin permits ease of manufacturing such as surface finish on details. Still another advantage of the present invention is that the positive retention caused by the greater surface contact area of the annular thrust member greatly increases in-thrust capacity.

The features of the present invention, which are believed to be novel, are set forth with particularity in the appended claims. The present invention, both as to its organization and manner of operation, together with the further advantages thereof, may best be understood by reference to the following description taken in connection with the accompanying drawings.

BRIEF DESCRIPTION OF THE DRAWINGS

FIG. 2 is a sectional view of one leg of the rock bit of FIG. 1, showing the first embodiment of the present invention;

FIG. 3 is a fragmentary sectional view of the rock bit taken along lines 3 — 3 of FIG. 2.

DESCRIPTION OF THE PREFERRED EMBODIMENT

Figure 1:
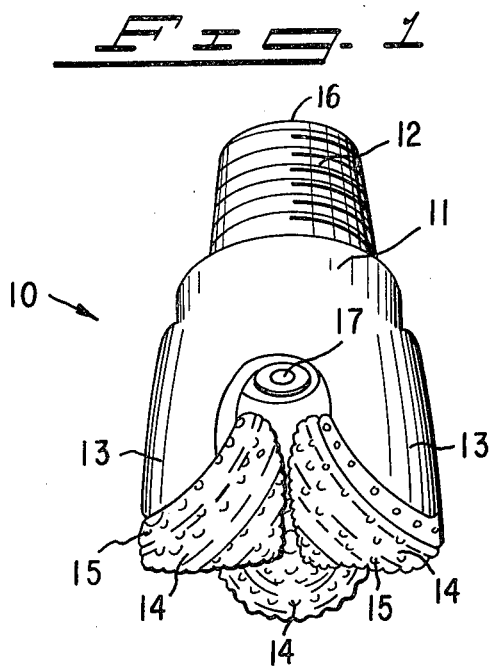
FIG. 1 is a perspective view of a three cone rotary rock bit constructed in accordance with the present invention.

Referring now to the drawings, FIG. 1 illustrates a three cone rotary rock bit generally indicated by arrow 10, having a bit body 11 which includes an upper threaded portion 12 for connection to the lower end of a rotary drill string (not shown). Extending from the bit body 11 are three substantially identical legs 13. The lower end of each of the legs is provided with an extended journal pin, details of which will be discussed hereinafter. Three rotary cone cutters 14 are rotatably positioned upon the three journal portions of the leg 13. Each of the cone cutters includes a cutting structure 15 on its outer face which is adapted to disintegrate the earth formations as the bit is rotated and moved downward. The cutting structure 15 is shown in the form of tungsten carbide inserts, however, it is to be understood that other cutting structures such as milled steel teeth with or without hard metal, may be formed on the cone cutters.

The bit 10 further includes a central passageway 16 extending along the center axis of body 11 to allow drilling fluid to enter from the upper section of the drill string immediately above and pass downward through three jet nozzles 17, one of which is shown in FIG. 1.

In operation, the drill bit 10 is connected as a lower member of a rotary drill string (not shown) and lowered into a well bore until the rotatable cone cutters 14 engage the bottom of the well bore. Prior to and during engagement with the bottom well bore the drill string is rotated, rotating bit 10 therewith. Drilling fluid is forced down through the interior passage of the rotary drill string and continues through the central passageway 16 of the bit 10, passing through the three nozzles 17, past the cutting structure 15 of the cutters 14 to the bottom of the well bore, and then upwardly into the annulus between the rotary drill string and the wall of the well bore carrying with it the cuttings and debris from the drilling operations.

FIG. 2 illustrates one of the legs 13 which has a cylindrical bore 19 extending through the lower extremity thereof. A journal pin 20 is provided having a cylindrical mounting surface 21 and a cylindrical bearing surface 23. The mounting surface 21 and bearing surface 23 lie in the same cylindrical plane with the mounting surface 21 extending into and engaging the bore 19 of the leg 13.

The cutter 14 is rotatably mounted about the end of the journal pin 20 which extends out of the leg 13. The cutter 14 includes an interior cavity formed by an inner end face 25, a frustro-conical face 26 and a cylindrical surface 27. The mouth of the cavity is formed by an inwardly facing flange 28 having an inner annular bearing surface which is adapted to frictionally engage an annular surface 29 formed on the leg 13. An annular compartment 31 is formed between the face of the leg 13 and the flange 28 of the cutter 14 for housing a resilient seal 32.

The inner end of the journal pin 20 includes an end face 33 which is adapted to frictionally engage the inner end face 25 of the cutter 14. A frustro-conical thrust surface 35 is also located on the end of the journal pin 20 for frictionally engaging the mating surface 26 of the cutter 14. It should be noted that these mating frustro-conical surfaces 26 and 35 are substantially parallel to the outer conical surface of the cutter 14. As a result, these mating surfaces 26 and 35 are substantially parallel to the bottom of the bore hole and function to efficiently absorb the normal loads passing from the cutter 14 to the journal pin 20.

The rock bit 10 further includes a three-piece annular thrust member 40, 40¹ and 41 having an inner cylindrical surface which extends around the bearing surface 23 of the journal pin 20. The thrust members 40 and 40¹ includes an outer cylindrical bearing surface 43 and a frustro-conical bearing surface 45 which are adapted to frictionally engage a portion of the frustro-conical surface 26 and the cylindrical surface 27 of the cutter 14. The bearing surface 43 functions to transmit the radial loads passing from the cutter 14 to the journal pins 20 while the bearing surface 45 functions to transmit a portion of the out-thrust load passing therethrough. The thrust members 40, 40¹ and 41 also include an outer end face 46 which is adapted to engage the inner surface of the flange 28 to transmit the in-thrust load passing therethrough. It has been found that this feature functions to hold the cutter 14 onto the journal pin 20 more effectively by having eight times the in-thrust capacity of ball bearings. It should be noted that the radial extension of the thrust member 41 does not extend out to contact the cylindrical surface 27 of the cutter 14. This clearance denoted by numeral 47 forms a portion of the lubrication system which is conventional and not shown in greater detail since it does not form part of the invention.

In accordance with the present invention, the journal pin 20 is secured to the leg 13 by means of an electron beam welder, of which the gun 50 is shown. This welder 50 functions to transmit a high energy beam across the mating surfaces of the journal pin 20 and of the bore 19, in order to fuse a weld therebetween. The high energy beam extends further along the journal pin 20 in order to fuse the mating surfaces between the journal pin 20 and the inner annular surface of the thrust members 40 and 41. As a result, a single weld functions to secure the journal pin 20 to the leg 13 and to secure the thrust members 40 and 41 to the journal pin 20. Because the thrust members 40 and 41 are retained within the groove formed by the end face of the flange 28 and the frustro-conical surface 26, the cutter 14 is axially retained by the thrust members 40 and 41 onto the journal pin 20. As can be seen, this construction eliminates the need for ball bearings to retain the cutter onto the journal pin thereby greatly increasing in-thrust load capacity, and, as illustrated, a single weld step serves a double function of securing the journal pin 20 to the leg 13 and retaining the cutter 14 onto the journal pin 20.

It should be noted that the welding gun 50 moves relative to the leg 13 in a rotating motion to create the cylindrical weld. However, since the journal angle is not normal to but is at an acute angle with respect to the center axis of the main bit body 10, the weld created is of different lengths around the cylindrical surface of the journal pin 20. As illustrated in FIG. 2, the shortest extension of the weld is located on the bottom sector of the journal pin 20 whereas the longest portion of the weld is on the top sector of the journal pin. As a result, as the electron beam gun 50 is rotated relative to the leg 13, its power output must continuously vary according to the depth of the weld that is required.

Figure 4:
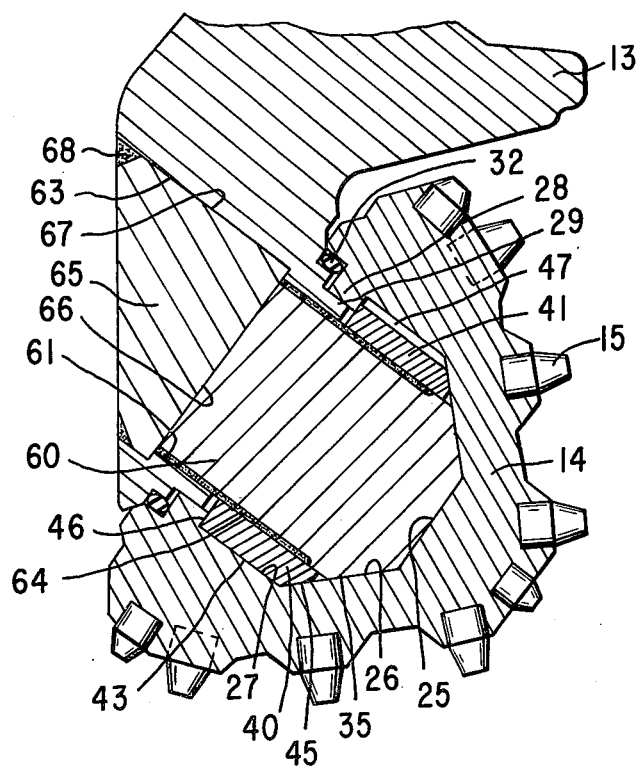
FIG. 4 is a fragmentary sectional view of one leg of a rotary rock bit illustrating a second embodiment of the present invention.

FIG. 4 obviates this requirement by providing a journal pin 60 which extends partially into a cylindrical bore 61 formed in the leg 13. As can be seen, this bore 61 is coextensive around the end of the journal pin 60 and as a result the weld 64, that is created between the journal pin 60 and the cylindrical bore 61 and the thrust members 40 and 41, is also the same length completely around the journal pin 60. As a result, the welding gun does not have to change its power as it is circularly moved relative to the leg 13.

Access to the cylindrical portion 61 is provided by a larger counter bore 63. After the welding process takes place, a plug element 65 is inserted into the counter bore 63. The plug element 65 includes an end face 66 which abuts the outer end of the journal pin 60. The plug element 65 further includes an outer cylindrical surface 67 which contacts the cylindrical surface of the bore 61. After the plug element 65 is inserted into the counter bore 61, an oval weld is created at the ends of the mating faces as denoted by numeral 68. All of the rest of the elements in FIG. 4 are similar to those shown in FIG. 2 and identical numerals are utilized to denote that structure.

As can be seen, in accordance with the present invention, it is now possible to have a separate journal pin which can be carburized and finish machined separately before insertion into the leg of the bit and, as mentioned previously, a single welding step is provided which not only welds the journal pin to the leg but it also welds the thrust members to the journal pin for retaining the cutter onto the journal pin.

It should be noted that various modifications can be made to the assembly while still remaining within the purview of the following claims.

What is claimed is:

1. A rotary rock bit having a main bit body with at least one leg extending downwardly therefrom, each leg comprising:
    a bore extending through the lower extremity of said leg;
    a journal pin having a mounting end extending into said bore and a bearing end;
    a cutter rotatably supported on the bearing end of said journal pin;
    annular means located about the bearing end of said journal pin for axially retaining said cutter on said journal pin, said annular retaining means comprising a hollow cylindrical thrust member, the interior of which extends around the bearing end of said journal pin; and
    weld means extending along the mounting and bearing ends of said journal pin for securing said journal pin to the bore of said leg and for securing the annular retaining means to said journal pin.

2. The combination of claim 1 wherein said cylindrical thrust member includes at least one surface which engages a bearing surface of said cutter for transferring a bearing load therethrough.

3. The combination of claim 2 wherein said cutter includes an internal groove partially receiving said thrust member.

4. The combination of claim 2 wherein said thrust member includes an end surface for engaging a bearing surface of said cutter.

5. The combination of claim 4 wherein said thrust face end surface is substantially parallel to the outer surface of said cutter.

6. The combination of claim 1 wherein said thrust member comprises a plurality of arcuate sections extending around the bearing end of said journal pin.

7. The combination of claim 1 wherein the mounting and bearing ends of said journal pin have cylindrical surfaces.

8. The combination of claim 7 wherein said leg bore includes a cylindrical interior surface for receiving and engaging the cylindrical surface of said journal pin mounting surface.

9. The combination of claim 7 wherein the cylindrical surfaces of the mounting and bearing ends of said journal pin are coextensive, with each surface having the same radius.

10. A rotary rock bit having a main bit body with at least one leg extending downwardly therefrom, each leg comprising:
    a cylindrical bore extending through the lower extremity thereof;
    a cylindrical journal pin having a mounting surface extending into and engaging the cylindrical bore of said leg and a bearing surface;
    a cutter rotatably supported on said journal pin;
    an annular thrust member extending completely around and engaging the cylindrical bearing surface of said journal pin;
    means for axially retaining said cutter to said thrust member; and
    a weld fusing the cylindrical mounting surface of said journal pin to the cylindrical bore of said leg and fusing the engaging surface of said annular thrust member to the cylindrical bearing surface of said journal pin.

11. The combination of claim 10 wherein the mounting surface and the bearing surface of said journal pin lie in the same cylindrical plane.

12. The combination of claim 11 wherein the weld extends axially equidistant around the cylindrical surface of said journal pin.

13. The combination of claim 11 wherein the common axis of the cylindrical bore of said leg and the cylindrical surface of said journal pin is at an acute angle with respect to the axis of the main bit body.

14. The combination of claim 13 wherein the cylindrical bore of said leg further includes a larger counter bore located on the outer side thereof with respect to the main bit body axis.

15. The combination of claim 14 further including a plug element having a cylindrical surface extending into and engaging the cylindrical surface of said counterbore and an end surface for abutting the end of said journal pin extending away from the main bit body axis.

16. The combination of claim 15 further including a weld fusing a portion of the cylindrical surface of said plug element to the cylindrical surface of said counterbore.

17. The combination of claim 10 wherein said retaining means includes an internal groove formed in said cutter partially receiving said thrust member.

18. The combination of claim 10 wherein said thrust member comprises at least two arcuate sections.

19. Method of manufacturing a rotary rock bit comprising the steps of:
    providing a main bit body having at least one leg extending downwardly therefrom;
    boring a cylindrical bore through the lower extremity of the leg;
    providing a journal pin having a cylindrical mounting end and a cylindrical bearing end;
    inserting the cylindrical mounting end of said journal pin into the cylindrical bore of the leg;
    providing a cutter having an undercut cavity formed therein;
    providing an annular thrust member having a cylindrical surface adapted to extend around the cylindrical bearing end of the journal pin;
    inserting said thrust member within the undercut cavity of said cutter to be axially retained therein;
    inserting said journal pin into the thrust member; and
    continuously welding along the cylindrical mounting and bearing ends of said journal pin for fusing the cylindrical surface of said journal pin mounting end to the cylindrical surface of said leg bore and for fusing the cylindrical surface to the annular thrust member to the cylindrical bearing end of said journal pin.

20. The method of claim 19 wherein the welding step utilizes an electron beam welding process.

21. A rotary rock bit having a main bit body with at least one leg extending downwardly therefrom, each leg comprising:

a bore extending through the lower extremity of said leg;

a journal pin having a mounting end extending into said bore and a bearing end;

a cutter rotatably supported on the bearing end of said journal pin;

annular means located about the bearing end of said journal pin for axially retaining said cutter on said journal pin; and continuous weld means extending along the mounting and bearing ends of said journal pin for securing said journal pin to the bore of said leg and for securing the annular retaining means to said journal pin.

* * * * *